(12) United States Patent
Shen et al.

(10) Patent No.: US 9,435,451 B2
(45) Date of Patent: Sep. 6, 2016

(54) ELECTRONIC EXPANSION VALVE

(71) Applicant: EMERSON CLIMATE TECHNOLOGIES (SUZHOU) CO., LTD., Jiangsu (CN)

(72) Inventors: Ke Shen, Jiangsu (CN); Jingxi Liu, Jiangsu (CN); Rongyao Han, Jiangsu (CN); Feixue Hu, Jiangsu (CN)

(73) Assignee: Emerson Climate Technologies (Suzhou) Co., Ltd., Jiangsu (CN)

( * ) Notice: Subject to any disclaimer, the term of this patent is extended or adjusted under 35 U.S.C. 154(b) by 96 days.

(21) Appl. No.: 14/381,531

(22) PCT Filed: Jan. 7, 2013

(86) PCT No.: PCT/CN2013/070164
§ 371 (c)(1),
(2) Date: Aug. 27, 2014

(87) PCT Pub. No.: WO2013/127276
PCT Pub. Date: Sep. 6, 2013

(65) Prior Publication Data
US 2015/0048266 A1    Feb. 19, 2015

(30) Foreign Application Priority Data

Feb. 28, 2012  (CN) .......................... 2012 1 0047737
Feb. 28, 2012  (CN) ...................... 2012 2 0068553 U

(51) Int. Cl.
*F16K 17/36*    (2006.01)
*F16K 31/02*    (2006.01)
(Continued)

(52) U.S. Cl.
CPC .............. *F16K 17/36* (2013.01); *F16K 31/02* (2013.01); *F16K 31/04* (2013.01); *F25B 41/062* (2013.01); *F25B 2341/0653* (2013.01); *Y02B 30/72* (2013.01)

(58) Field of Classification Search
CPC .............. F16K 31/042; F16K 31/046; F16K 31/0679; F16K 31/105; F16K 31/02; F16K 31/04; F25B 41/062; F25B 2341/0653

USPC .............. 251/69, 71, 129.1, 129.11, 129.12, 251/129.15, 129.18, 129.19, 129.2, 264, 251/273–278
See application file for complete search history.

(56) References Cited

U.S. PATENT DOCUMENTS 2,268,960 A * 1/1942 Ray ................................. 137/66
2,873,069 A * 2/1959 Matthews ..................... 236/1 H
(Continued)

FOREIGN PATENT DOCUMENTS

| CN | 2536849 Y | 2/2003 |
|----|-----------|--------|
| CN | 101918743 A | 12/2010 |

(Continued)

OTHER PUBLICATIONS

International Search Report and Written Opinion of the ISA, ISA/CN, Beijing, mailed Apr. 18, 2013.
(Continued)

*Primary Examiner* — Matthew W Jellett
(74) *Attorney, Agent, or Firm* — Harness, Dickey & Pierce, P.L.C.

(57) ABSTRACT

An electronic expansion valve includes a valve component for adjusting the flow of fluid. The valve component includes a valve body, a valve seat provided in the valve body, a valve needle able to open and close the valve seat, an actuating mechanism driving the axial movement of the valve needle and a drive mechanism supplying the actuating mechanism with motive power. The actuating mechanism includes a spindle able to move axially. The electronic expansion valve further includes an electromagnetic retaining mechanism for retaining the spindle. The valve is constructed such that when electricity is supplied to the electromagnetic retaining mechanism, the spindle is retained in a first axial position where the valve needle can adjust the opening degree of the valve seat; when the electricity to the electromagnetic retaining mechanism is cut, the spindle is released into a second axial position where the valve needle closes the valve seat.

23 Claims, 6 Drawing Sheets

(51) Int. Cl.
*F16K 31/04* (2006.01)
*F25B 41/06* (2006.01)

(56) References Cited

U.S. PATENT DOCUMENTS

| | | | |
|---|---|---|---|
| 4,546,955 A | | 10/1985 | Beyer et al. |
| 4,948,091 A | * | 8/1990 | Satoh et al. ............... 251/65 |
| 7,059,581 B2 | * | 6/2006 | Invernizzi ............... 251/129.12 |
| 8,100,381 B2 | * | 1/2012 | Roschke et al. ........ 251/129.11 |
| 2004/0245487 A1 | * | 12/2004 | Dorigo et al. .......... 251/129.11 |
| 2006/0175565 A1 | | 8/2006 | Nungesser et al. |

FOREIGN PATENT DOCUMENTS

| | | |
|---|---|---|
| CN | 102287536 A | 12/2011 |
| CN | 202501077 U | 10/2012 |
| EP | 0107445 A1 | 5/1984 |
| EP | 1503122 A1 | 2/2005 |
| JP | 2003232462 A | 8/2003 |
| WO | WO-2006086236 A1 | 8/2006 |

OTHER PUBLICATIONS

European Search Report regarding Application No. 13755385.5 mailed Oct. 1, 2015.

* cited by examiner

ELECTRONIC EXPANSION VALVE

CROSS-REFERENCE TO RELATED APPLICATIONS

This application is a 371 U.S. National Stage of International Application No. PCT/CN2013/070164, filed Jan. 7, 2013, which claims priority from Chinese Patent Application No. 201210047737.X titled "ELECTRONIC EXPANSION VALVE" and filed with the Chinese State Intellectual Property Office on Feb. 28, 2012, and Chinese Patent Application No. 201220068553.7 titled "ELECTRONIC EXPANSION VALVE" and filed with the Chinese State Intellectual Property Office on Feb. 28, 2012. The entire disclosures of the Chinese Patent Applications are incorporated herein by reference.

TECHNICAL FIELD

The application relates to an electronic expansion valve.

BACKGROUND

An electronic expansion valve is an important component in a refrigerating/heating system, and is primarily used to regulate flow rate of refrigerant fluid. A conventional electronic expansion valve generally includes a drive mechanism (e.g. a step motor), an actuation mechanism (e.g. a threaded screw rod mechanism), a throttle mechanism (e.g. a valve needle and a valve seat) and related auxiliary mechanism.

However, a conventional electronic expansion valve, after de-energized, cannot close automatically since a driving force applied to the threaded screw rod mechanism is eliminated. Hence, in order to break the fluid circuit securely, an independent electromagnetic switch valve (which is generally a normal close valve, switches on when being energized, and switches off when being de-energized) is generally connected in series at upstream or downstream of the electronic expansion valve. In this way, when the system is de-energized, the electromagnetic switch valve will switch off automatically to break the fluid circuit.

However, if the above configuration is adopted, on the one hand, the total cost of the system is increased since an independent electromagnetic switch valve is additionally provided, and one the other hand, in order to connect in series the electromagnetic switch valve, two braze welding joints (i.e., at an inlet and an outlet of the electromagnetic switch valve) will be additionally provided in the pipeline, which not only increases the assembling cost of the system, but also increases the risk of leakage of the system.

Another method for achieving automatic closing of an electronic expansion valve after de-energized is to provide the electronic expansion valve with a standby power supply, for example, to additionally provide a super-capacitor for storing electric energy or be equipped with a standby battery on a control board of the electronic expansion valve. However, this method also increases cost of the electronic expansion valve and requires a more complicated controller.

Therefore, an electronic expansion valve which may close automatically after de-energized is desired.

SUMMARY

One object of one or more embodiments of the present application is to provide an electronic expansion valve which may close automatically after de-energized.

Another object of one or more embodiments of the present application is to provide an electronic expansion valve which can decrease the overall cost of a refrigerating/heating system.

Still another object of one or more embodiments of the present application is to provide an electronic expansion valve which can increase the safety of a refrigerating/heating system.

In order to achieve one or more of the above objects, an electronic expansion valve is provided according to one aspect of the present application. The electronic expansion valve includes a valve component for regulating flow rate of fluid flowing through the electronic expansion valve. The valve component includes a valve body, a valve seat arranged in the valve body, a valve needle configured to open and close the valve seat, an actuation mechanism for driving the valve needle to move axially, and a drive mechanism for providing the actuation mechanism with motive power. The actuation mechanism includes a spindle which is movable axially. The electronic expansion valve further includes an electromagnetic retaining mechanism for retaining the spindle. The electromagnetic retaining mechanism is configured to retain the spindle in a first axial position at which the valve needle is allowed to adjust the opening degree of the valve seat when the electromagnetic retaining mechanism is energized, and to release the spindle to a second axial position at which the valve needle closes the valve seat when the electromagnetic retaining mechanism is de-energized.

Preferably, the electromagnetic retaining mechanism includes an electromagnetic coil, a fixed iron stationary relative to the coil, and a movable iron movable relative to the fixed iron.

Preferably, the movable iron is connected to a first end of the spindle in such a manner that the movable iron is rotatable but cannot move axially.

Preferably, a rolling bearing is provided between the movable iron and the first end of the spindle, and includes an inner race fitted with the first end of the spindle and an outer race fitted with the movable iron.

Preferably, a nut member for limiting an axial movement of the inner race of the rolling bearing is provided on the first end of the spindle, and a nut member for limiting an axial movement of the outer race of the rolling bearing is provided at an end, fitted with the spindle, of the movable iron.

Preferably, a retaining ring for limiting an axial movement of the inner race of the rolling bearing is provided on the first end of the spindle, and a retaining ring for limiting an axial movement of the outer race of the rolling bearing is provided in the inner cavity of the movable iron.

Preferably, a retaining ring is provided on the first end of the spindle and is configured to limit an axial displacement of the inner race of the rolling bearing, and a nut member is provided at an end, fitted with the spindle, of the movable iron and is configured to limit an axial movement of the outer race of the rolling bearing.

Alternatively, the movable iron is fixedly connected to the first end of the spindle.

Preferably, a thrust bearing is provided on a portion of the spindle close to the first end thereof and is configured to limit the axial displacement of the spindle by abutting against a fixing component of the electronic expansion valve.

Preferably, the thrust bearing is a one-way thrust ball bearing.

Preferably, the longitudinal axis of the electromagnetic retaining mechanism is substantially coincident with the axis of rotation of the spindle.

Preferably, the electromagnetic retaining mechanism is arranged at an upper side of the valve component.

Alternatively, the longitudinal axis of the electromagnetic retaining mechanism is substantially perpendicular to the axis of rotation of the spindle.

Preferably, the first end of the spindle is provided thereon with an annular stopper or groove, and one end of the movable iron is provided thereon with a matched component capable of being engaged with the stopper or groove. When the electromagnetic retaining mechanism is energized, the matched component protrudes to be engaged with the stopper or groove, so as to retain the spindle in the first axial position, and when the electromagnetic retaining mechanism is de-energized, the matched component retracts so as to release the spindle to the second axial position.

Preferably, the distance between the first axial position and the second axial position is larger than or equal to the largest stroke of the valve needle in adjusting the opening degree of the valve seat.

Preferably, the actuation mechanism further includes: a supporting seat fixed relative to the vale body, a through hole being formed in the supporting seat; and a nut sleeve which is slidable but cannot rotate in the through hole, a second end of the spindle being operatively connected to the valve needle via the nut sleeve.

Preferably, the through hole has a non-circular inner circumference surface, and the nut sleeve has a non-circular outer circumferential surface matched with the non-circular inner circumferential surface of the through hole.

Preferably, the through hole has a polygon inner circumferential surface, and the nut sleeve has a polygon outer circumferential surface matched with the polygon inner circumferential surface of the through hole.

Preferably, the through hole has a circular inner circumferential surface, with a key slot or key being formed on the inner circumference surface, and the nut sleeve has a circular outer circumferential surface, with a key or key slot being formed on the outer circumferential surface and being matched with the key slot or key on the inner circumference surface.

Preferably, the nut sleeve includes a first section having an internal screw thread and a second section having no screw thread. An external screw thread is formed at the second end of the spindle, and the second end of the spindle is engaged with the first section of the nut sleeve via the internal screw thread and the external screw thread.

Preferably, an end of the valve needle is fitted in the second section of the nut sleeve.

Preferably, a stepped portion is provided between the first section and the second section of the nut sleeve. A compression spring is provided between the stepped portion and the valve needle, and the valve needle is slidable in the second section of the nut sleeve.

Preferably, a fixing ring for retaining the valve needle is provided at an end of the second section of the nut sleeve.

Preferably, a stepped portion is formed on an outer side of an end, fitted with the valve needle, of the nut sleeve, and a compression spring is provided between the stepped portion and the supporting seat.

Preferably, a sealing block is provided at an end of the valve needle fitted with the valve seat and is configured to be capable of abutting against an end face of the valve seat.

Preferably, the drive mechanism includes a stator and a rotor rotatable in the stator, and the spindle is fitted with the rotor such as to rotate together.

Preferably, the spindle is fixedly connected with the rotor.

Preferably, the spindle is slidably fitted in the rotor.

The advantageous of an electronic expansion valve according to one or more embodiments of the present application lie in as follows.

In an electronic expansion valve according to an embodiment of the present application, the electromagnetic retaining mechanism for retaining the spindle of the valve component is provided, and the electromagnetic retaining mechanism is configured to retain the spindle in a first axial position at which the valve needle is allowed to adjust the opening degree of the valve seat when the electromagnetic retaining mechanism is energized, and to release the spindle to a second axial position at which the valve needle closes the valve seat when the electromagnetic retaining mechanism is de-energized. Hence, when the system or the electronic expansion valve is de-energized suddenly, though the actuation mechanism consisted by a threaded screw rod mechanism cannot move the valve needle to close the valve seat, the spindle as a part of the actuation mechanism is released by the electromagnetic retaining mechanism and then may fall off, for example, under its self-gravity or a biasing force of any other elastic component(s), to a position where the valve needle can close the valve seat, thereby closing reliably the electronic expansion valve. Therefore, the technical solution in the present application can close the electronic expansion valve automatically when the electronic expansion valve is de-energized.

In addition, since the electronic expansion valve itself can close when it is de-energized, an independent electromagnetic switch valve or other valve components are not required to be additionally provided in a system in which the electronic expansion valve is used, thereby reducing the overall cost of the system. Furthermore, since an additional electromagnetic switch valve is omitted, the number of the joints (braze welding joints) for connecting the electromagnetic switch valve in pipeline of the system are also reduced, which, on the one hand, reduces the risk of leakage of the system, and on the other hand, reduces the assembly procedures of the system and saves labor costs.

Furthermore, in the electronic expansion valve according to the present application, since an electromagnetic retaining mechanism is adopted, the spindle connected to a movable iron of the electromagnetic mechanism may reliably move to a position which allows the valve needle to close the valve seat when the electronic expansion valve is de-energized, thereby improving the safety of the electronic expansion valve and thus the system greatly.

In a further embodiment of the present application, the movable iron is connected to a first end of the spindle in such a manner that the movable iron is rotatable but cannot move axially. For example, a rolling bearing may be provided between the movable iron and the first end of the spindle. In this way, when the spindle is driven to rotate by the drive mechanism (a motor), the movable iron does not rotate relative to the fixed iron of the electromagnetic retaining mechanism, thereby minimizing the gap between the movable iron and the fixed iron and achieving good attraction.

In a further embodiment of the present application, the rotatable connection between the movable iron and the first end of the spindle may be implemented in any one of ways as follows: 1) providing a nut member on the first end of the spindle to limit the axial displacement of the inner race of the rolling bearing, and providing a nut member at an end of the movable iron fitted with the spindle to limit the axial displacement of the outer race of the rolling bearing; 2) providing a retaining ring on the first end of the spindle to limit the axial displacement of the inner race of the rolling bearing, and providing a retaining ring in the inner cavity of the movable iron to limit the axial displacement of the outer race of the rolling bearing; and 3) providing a retaining ring on the first end of the spindle to limit the axial displacement of the inner race of the rolling bearing, and providing a nut member at the end of the movable iron to limit the axial displacement of the outer race of the rolling bearing. In the ways, the spindle can be stably connected to the movable iron in such a manner to be rotatable but cannot move axially relative to each other, and a good assembibility may be achieved.

In a further embodiment of the present application, the movable iron may be fixedly connected to the first end of the spindle, which further simplifies the assembly process of the electronic expansion valve. In addition, with such a configuration, a thrust bearing may be further provided on the spindle to reliably limit the upward displacement of the spindle.

In a further embodiment of the present application, the longitudinal axis of the electromagnetic retaining mechanism may be substantially coincident with the axis of rotation of the spindle. For example, the electromagnetic retaining mechanism may be arranged at an upper side of the valve component. With such a structure, a compact arrangement may be achieved.

In a further embodiment of the present application, the longitudinal axis of the electromagnetic retaining mechanism may be substantially perpendicular to the axis of rotation of the spindle. For example, it is possible to provide an annular stopper or groove at a first end of the spindle, and to provide a matched component engaged with the stopper or groove at an end of the movable iron. When the electromagnetic retaining mechanism is energized, the matched component protrudes to be engaged with the stopper or groove, thereby retaining the spindle in the first axial position, and when the electromagnetic retaining mechanism is de-energized, the matched component may retract under the action of the biasing component such as a spring, thereby releasing the spindle to the second axial position. In such a configuration, since the gravity of the spindle and components connected with the spindle such as the nut sleeve and the valve needle is largely borne by the matched component, and the electromagnetic coil mainly functions to retain the matched component in a protruded position, a small electromagnetic coil may be adopted to further reduce the costs. Furthermore, with such a configuration, the electromagnetic retaining mechanism can be arranged more flexibly relative to the valve component.

In a further embodiment of the present application, the spindle is connected to the valve needle by a nut sleeve, and the nut sleeve is slidable in the supporting seat but cannot rotate relative to the supporting seat. Thus, the rotation driving force of the motor results in an axial movement of the nut sleeve via the screw thread pair of the spindle and the nut sleeve. In addition, since the load generated by the axial displacement of the spindle is largely exerted on the electromagnetic retaining mechanism, the rotor connected to the spindle is only subjected to the rotation load without the axial load, and this is extremely advantageous for the motor.

In a further embodiment of the present application, the spindle may be fixedly connected to the rotor of the motor, or may also be slidably fitted in the rotor. Especially in the latter case, it may better ensure that the rotor may be free from the axial load, and may save the space required for the axial movement of the rotor along with the spindle.

BRIEF DESCRIPTION OF THE DRAWINGS

Features and advantages of one or more embodiments of the present application may become apparent from the following description made with reference to the drawings in which.

DETAILED DESCRIPTION

Figure 1:
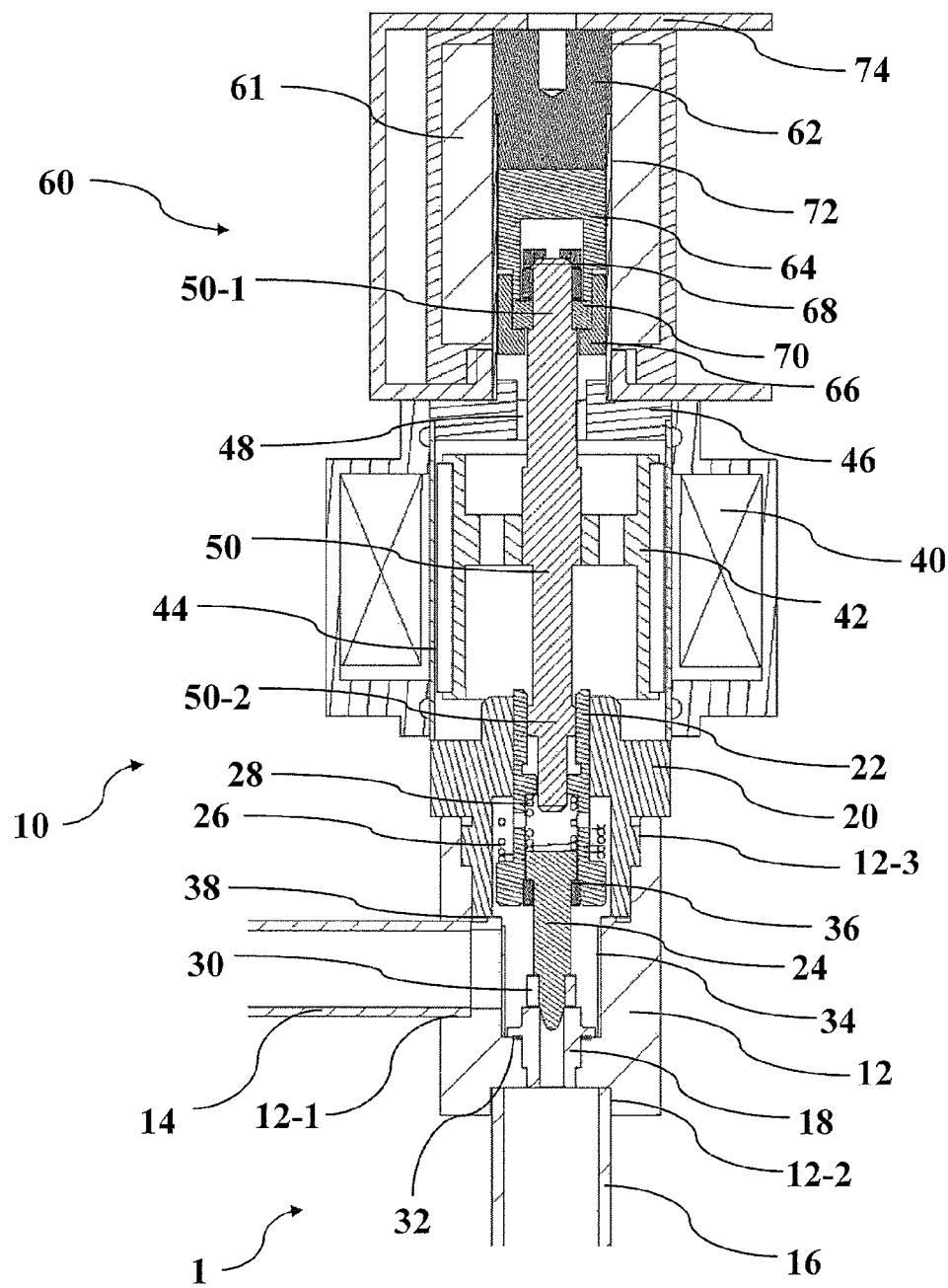
FIG. 1 is a sectional view of an electronic expansion valve according to a first embodiment of the present application.
Figure 2:
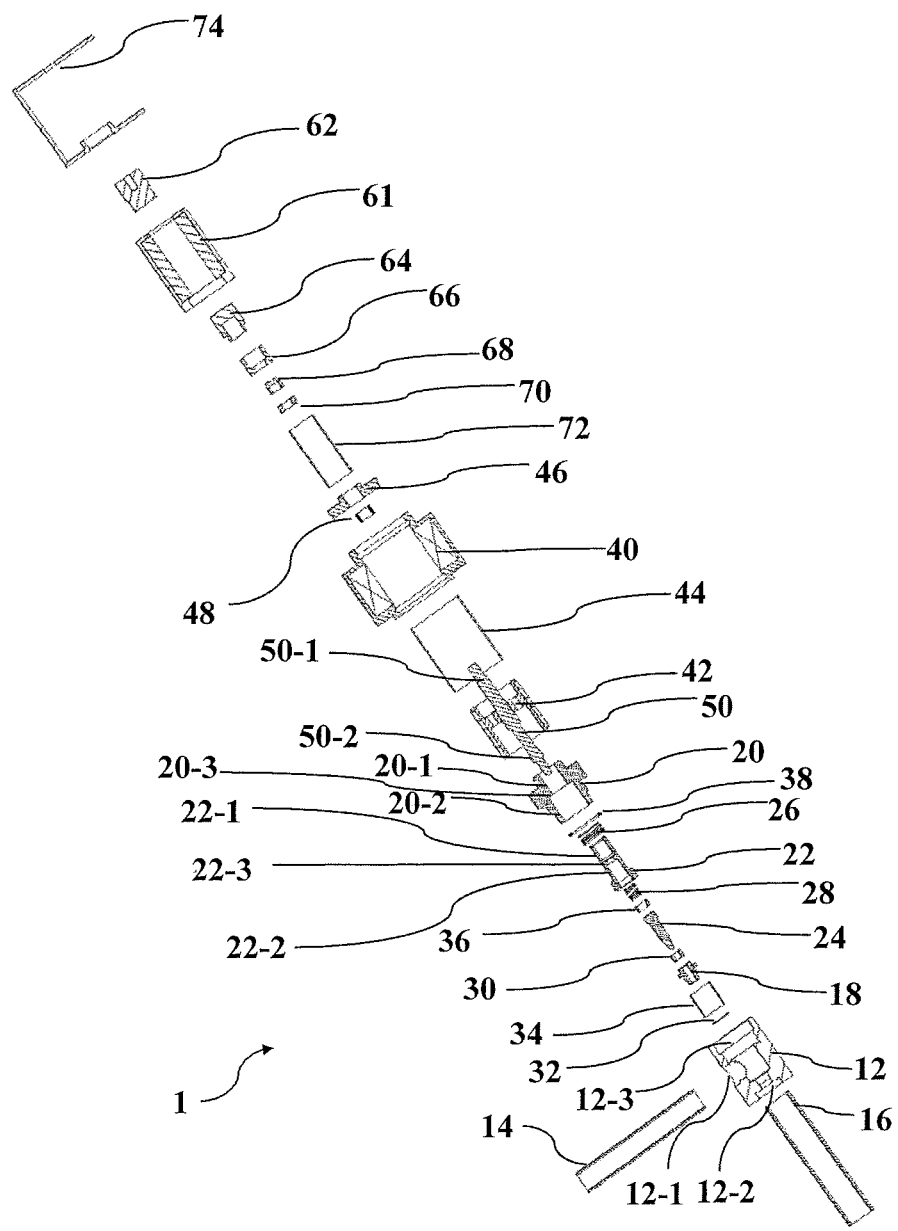
FIG. 2 is an exploded sectional view of the electronic expansion valve shown in FIG. 1.

The following description of the preferred embodiments is only illustrative rather than a limitation to the present application and application or use thereof.

The configuration of the electronic expansion valve according to a first embodiment of the present application will be described first with reference to FIGS. 1 to 4.

The electronic expansion valve 1 according to the present application may include a valve component 10 for regulating flow rate of fluid flowing through the electronic expansion valve and an electromagnetic retaining mechanism 60 for retaining or releasing an actuation mechanism in the valve component 10.

Specifically, the valve component 10 may include a valve body 12. The valve body 12 is provided therein with an inlet 12-1 connected with an inflow pipe 14 and an outlet 12-2 connected with an outflow pipe 16. A valve seat 18 may be provided at the outlet 12-2 of the valve body 12. The electronic expansion valve 1 may further include a valve needle 24 configured to open and close the valve seat 18, the actuation mechanism for driving the valve needle 24 to move axially, and a drive mechanism for applying motive power to the actuation mechanism. Furthermore, a filter screen 34 in a substantially cylindrical shape may be provided in the valve cavity of the valve body 12 to filter out impurities in the fluid flowing through the electronic expansion valve. Furthermore, a sealing gasket 32 may be further provided between the valve seat 18 and the valve body 12 to realize sealing connection between the both.

In the example illustrated, the drive mechanism may be a motor including a stator 40 and a rotor 42. The rotor 42 is rotatable in the stator 40. A sleeve 44 may be arranged between the stator 40 and the rotor 42 for the purpose of convenient assembling and easy sealing. A lower end of the sleeve 44 or the stator 40 is fixed to a supporting seat 20 which will be described hereinafter, and an upper end of the sleeve 44 or the stator 40 is provided with a stopper 46.

The actuation mechanism may include the supporting seat 20 fitted with an upper opening 12-3 of the valve body 12, a nut sleeve 22 which is slidable but cannot rotate in the supporting seat 20, and a spindle 50 connected threadedly to the nut sleeve 22. A sealing ring 38 may be provided between the supporting seat 20 and the valve body 12 to provide a better sealing effect. The spindle 50 may be fixedly connected to the rotor 42 to rotate together.

Figure 3:
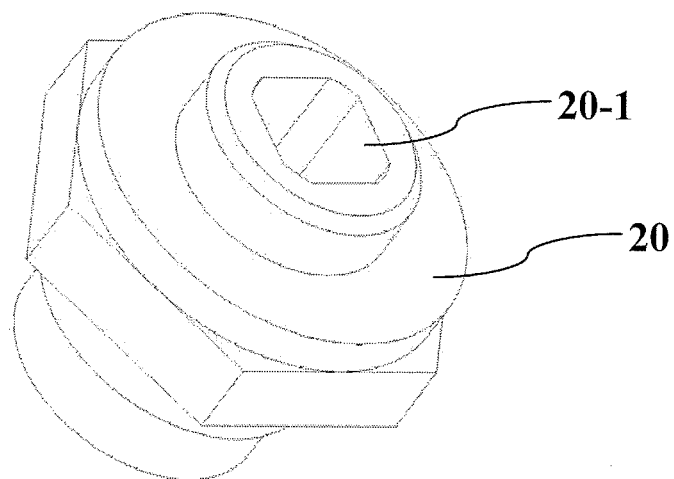
FIG. 3 is a perspective view of a supporting seat in the electronic expansion valve shown in FIG. 1.
Figure 4:
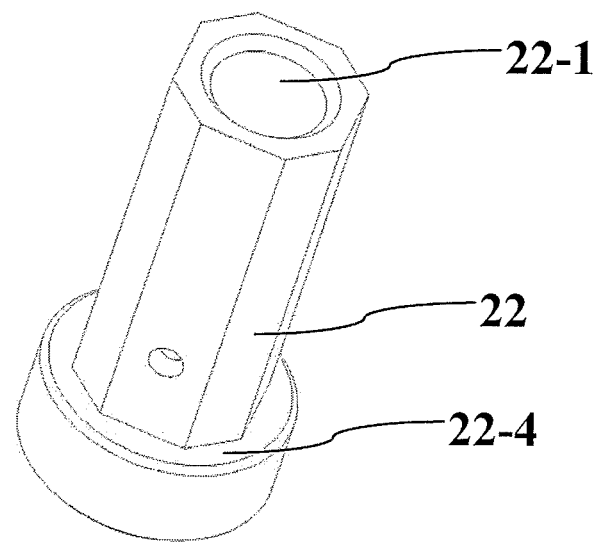
FIG. 4 is a perspective view of a nut sleeve in the electronic expansion valve shown in FIG. 1.
Figure 5:
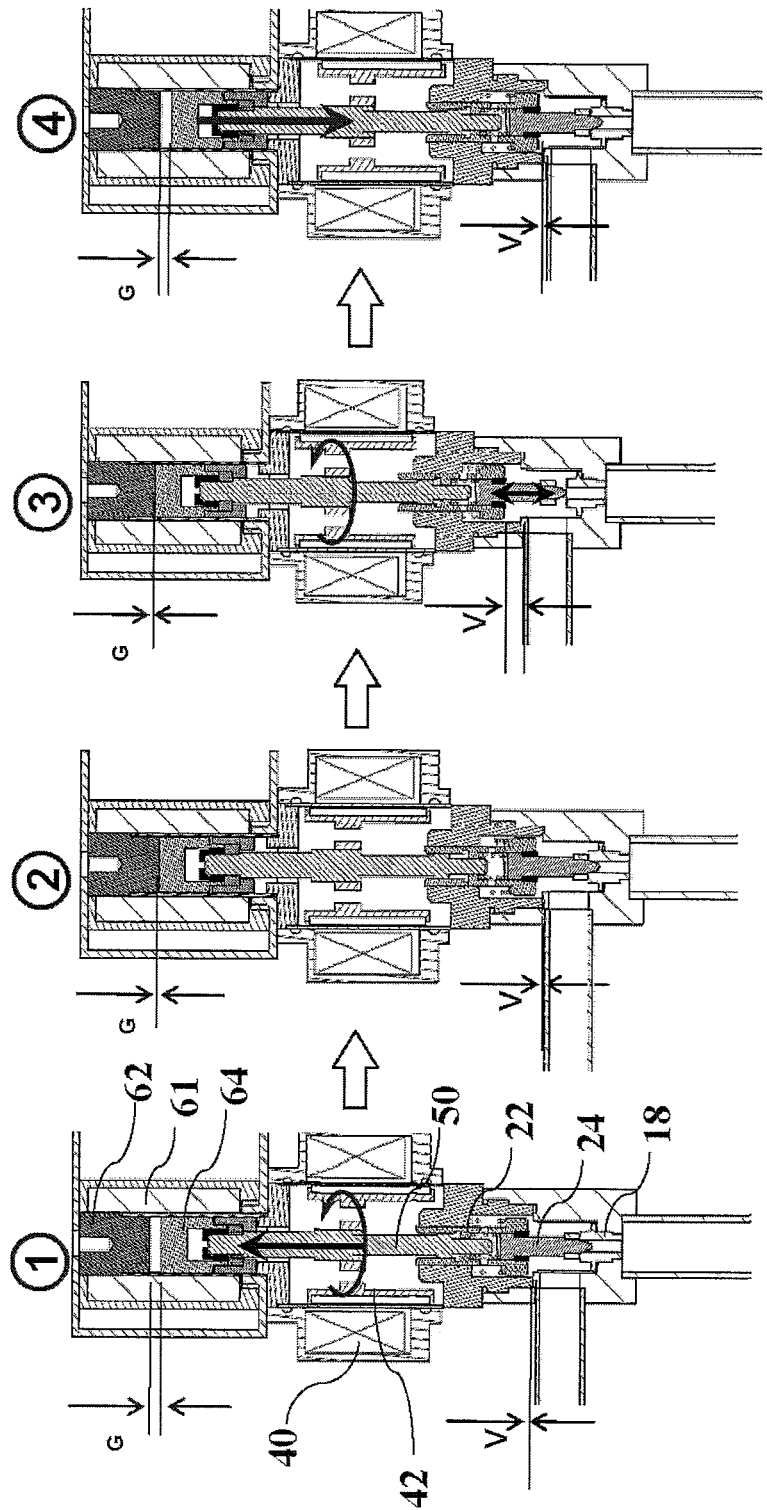
FIGS. 5A, 5B, 5C and 5D show operation process of the electronic expansion valve.

Specifically, a through hole 20-1 is formed in the supporting seat 20, and the nut sleeve 22 is slidable but cannot rotate in the through hole 20-1. Particularly, the through hole 20-1 may have a non-circular or polygon inner circumferential surface, for example, a substantially octagon configuration as shown in FIG. 3. The nut sleeve 22 may have a non-circular or polygon outer circumferential surface matched with the non-circular inner circumferential surface of the through hole 20-1, for example, an octagon configuration as shown in FIG. 4.

The configurations of the supporting seat 20 and the nut sleeve 22 are not limited to the illustrated example, instead, they may be any configurations which allow the supporting seat 20 and the nut sleeve 22 to slide but not rotate relative to each other. For example, the through hole 20-1 of the supporting seat 20 may have a circular inner circumferential surface with a key slot or a key being formed thereon. The nut sleeve may have a circular outer circumferential surface, and a key or key slot matched with the key slot or key on the supporting seat are formed on the outer circumferential surface of the nut sleeve. It is to be understood by the skilled in the art that, lots of configurations can achieve the above function, which will not be listed one by one herein.

The nut sleeve 22 may include a first section 22-1 having an internal thread, and a second section 22-2 having no screw thread. An external screw thread is formed at a second end (a lower end) 50-2 of the spindle 50. The second end 50-2 of the spindle 50 may be connected to the valve needle 24 via the nut sleeve 22. Specifically, the external screw thread of the second end 50-2 of the spindle 50 may be engaged with the internal screw thread of the nut sleeve 22 to form a threaded screw rod mechanism, thereby transforming the rotation movement of the rotor 42 and the spindle 50 into an axial movement of the nut sleeve 22.

The valve needle 24 may have one end fitted in the second section 22-2 of the nut sleeve 22, and the other end cooperating with the valve seat 18 to open or close the valve seat 18. In addition, the opening degree of the electronic expansion valve may be adjusted by adjusting the distance between the valve needle 24 and the valve seat 18, so as to achieve the accurate control to the flow rate of the fluid. The valve needle 24 may be fixedly fitted in the nut sleeve 22. Alternatively, the valve needle 24 may be slidably fitted in the nut sleeve 22, and is urged at one end thereof by a spring so as to achieve a better sealing. Specifically, the nut sleeve 22 is provided with a stepped portion 22-3 between the first section 22-1 and the second section 22-2, and a compression spring 28 is provided between the stepped portion 22-3 and the valve needle 24. Further, a fixing ring 36 for retaining the valve needle 24 is provided at an end of the second section 22-2 of the nut sleeve 22. With the above arrangement, the valve needle 24 is axially movable along with the nut sleeve 22. Further, when the nut sleeve 22 moves downwards and the valve needle 24 abuts against the valve seat 18, the compression spring 28 will apply a spring force to an end of the valve needle 24 so as to enable a proper abutting force between the valve needle 24 and the valve seat 18, which, on the one hand, protects the valve needle and the valve seat from being damaged, and on the other hand, provides a reliable sealing effect.

To provide a better sealing effect, a sealing block 30 may be provided at the end of the valve needle 24 fitted with the valve seat 18 and can abut against an end face of the valve seat 18.

A stepped portion 22-4 is formed on an outer side of the end of the nut sleeve 22 fitted with the valve needle 24 (see FIG. 4), and a compression spring 26 is provided between the stepped portion 22-4 and the supporting seat 20. The compression spring 26 may provide a downward spring force to the nut sleeve 22, so as to assist the nut sleeve 22, the valve needle 24 and the spindle 50 to move to a position where the valve needle 24 closes the valve seat 18 when the electronic expansion valve is de-energized, as will be described below. It may be appreciated by the skilled in the art that, since such a downward force may arise from weights of the nut sleeve 22, the valve needle 24 and the spindle 50 themselves, the compression spring 26 can be omitted.

The electromagnetic retaining mechanism 60 may be arranged on the upper side of the valve component 10, and the electromagnetic retaining mechanism 60 may be arranged such that its axial direction is substantially coincident with the axis of rotation of the spindle 50. The electromagnetic mechanism 60 is configured to retain the spindle 50 of the actuation mechanism of the valve component 10. Specifically, the electromagnetic retaining mechanism 60 may be configured to retain the spindle 50 at a first axial position at which the valve needle 24 is allowed to adjust the opening degree of the valve seat 18 when the electromagnetic retaining mechanism 60 is energized, and to release the spindle 50 to a second axial position at which the valve needle 24 closes the valve seat 18 when the electromagnetic retaining mechanism 60 is de-energized.

According to one embodiment of the present application, the electromagnetic retaining mechanism 60 may include an electromagnetic coil 61 which generates a magnetic force when being energized, a fixed iron 62 which is fixed relative to the electromagnetic coil 61, and a movable iron 64 which is movable relative to the fixed iron 62. To facilitate the assembly, a substantially cylindrical sleeve 72 may be provided in the electromagnetic coil 61. One end of the fixed iron 62 may be fixed in the sleeve 72. The movable iron 64 is slidable in the sleeve 72. In addition, a magnetic yoke 74 may be provided outside the electromagnetic coil 61. The magnetic yoke 74 may, on the one hand, increase the magnet force of the electromagnetic retaining mechanism 60, and on the other hand, be employed as a fixing holder of the electronic expansion valve 1.

In the embodiment shown in FIG. 1, the movable iron 64 is connected to a first end (an upper end) 50-1 of the spindle 50 in such a manner that the movable iron 64 is rotatable but cannot move axially. Specifically, a rolling bearing 70 is provided between the movable iron 64 and the first end 50-1 of the spindle 50. An inner race of the rolling bearing 70 is fitted with the first end 50-1 of the spindle 50, and an outer race of the rolling bearing 70 is fitted with the movable iron 64.

More specifically, a nut member 68 may be provided at the first end 50-1 of the spindle 50 so as to limit an axial displacement of the inner race of the rolling bearing 70, and a nut member 66 may be provided at the end (the lower end) of the movable iron 64 fitted with the spindle 50 so as to limit an axial displacement of the outer race of the rolling bearing 70. In this way, the spindle 50 is rotatable relative to the movable iron 64 (in other words, the movable iron 64 may not rotate, which facilitates attraction between the movable iron 64 and the fixed iron 62), and is movable axially along with the movable iron 64.

A through hole, through which the spindle 50 passes, is provided in the stopper 46, and a sliding bearing 48 may be provided in the through hole. A part of the spindle 50 is supported by the sliding bearing 48 so as to enable smoother rotation and axial movement.

The operation process of the electronic expansion valve 1 according to the first embodiment of the present application is described hereinafter with reference to FIGS. 5A, 5B, 5C and 5D. In these features, the letter G represents a gap between the fixed iron 62 and the movable iron 64, and the letter V represents a distance from the lower end of the nut sleeve 22 to a certain horizontal plane.

FIG. 5A shows various components of the electronic expansion valve 1 in an initial state. In such a state, G reaches a maximum value, and V reaches a minimum value (for example, zero). Starting from such a state, the stator 40 is energized first, and meanwhile the electromagnetic coil 61 is kept to be de-energized. As a result, the spindle 50 is driven to rotate by the rotor 42. Since the lower end of the spindle 50 is threadedly fitted with the nut sleeve 22, and the nut sleeve 22 cannot rotate, the spindle 50 will move upwards and axially while rotating. Meanwhile, since the movable iron 64 cannot move axially relative to the spindle 50, the movable iron 64 may also move upwards till the movable iron 64 abuts against the fixed iron 62. Then, various components of the electronic expansion valve will be in a state shown in FIG. 5B.

In a state shown in FIG. 5B, (G reaches a minimum value, for example, zero, and V reaches a minimum value), the valve needle 24 still closes the valve seat 18. Then, the electromagnetic coil 61 is energized, and generates a magnetic force to attract the movable iron 64. In addition, the stator 40 is kept being energized, and the spindle 50 will keep rotating. However, since the spindle 50 cannot move upwards further, the nut sleeve 22 will be pulled upwards due to the thread pair of the spindle 50 and the nut sleeve 22, thereby driving the valve needle 24 to move upwards so as to enable a certain opening degree of the electronic expansion valve 1. Then, various components of the electronic expansion valve will be in a state shown in FIG. 5C.

In the state shown in FIG. 5C (G reaches a minimum value, for example, zero, and V may reach a value between the minimum value and the maximum value), the stroke of the valve needle 24 may be controlled by controlling the stator 40. In such a state, the electromagnetic coil 61 is kept being energized, whereas the stator 40 may be energized or de-energized and rotated in a forward direction or in a reverse direction depending on control requirements.

When the electronic expansion valve 1 is de-energized suddenly, various components of the electronic expansion valve will be in a state shown in FIG. 5D (G reaches a maximum value and V reaches a minimum value). In such a state, since the electromagnetic coil 61 is de-energized, the fixed iron 62 will not attract the movable iron 64. Thus, the movable iron 64, the spindle 50, the nut sleeve 22 and the valve needle 24 will fall downwards together under gravity and spring force of the compression spring 26 so that the valve needle 24 closes the valve seat 18.

Then, before the electronic expansion valve 1 is powered on again for normal operation, the rotor 42 may be first driven to rotate forwardly or reversely by certain turns until the spindle 50 and the nut sleeve 22 reach the initial position as shown in FIG. 5A, and then the normal operations as shown in FIGS. 5A, 5B and 5C may be performed.

It is to be noted that, the position of the spindle 50 as shown in FIGS. 5B and 5C (G reaches a minimum value) corresponds to the first axial position as defined in the claims, and the position as shown in FIGS. 5A and 5D (G reaches a maximum value) corresponds to the second axial position as defined in the claims. Furthermore, the distance between the first axial position and the second axial position (i.e., G) may be set to be larger or equal to the maximum stroke (V reaches a maximum value) of the valve needle 24 in adjusting the opening degree of the valve seat 18.

Figure 6:
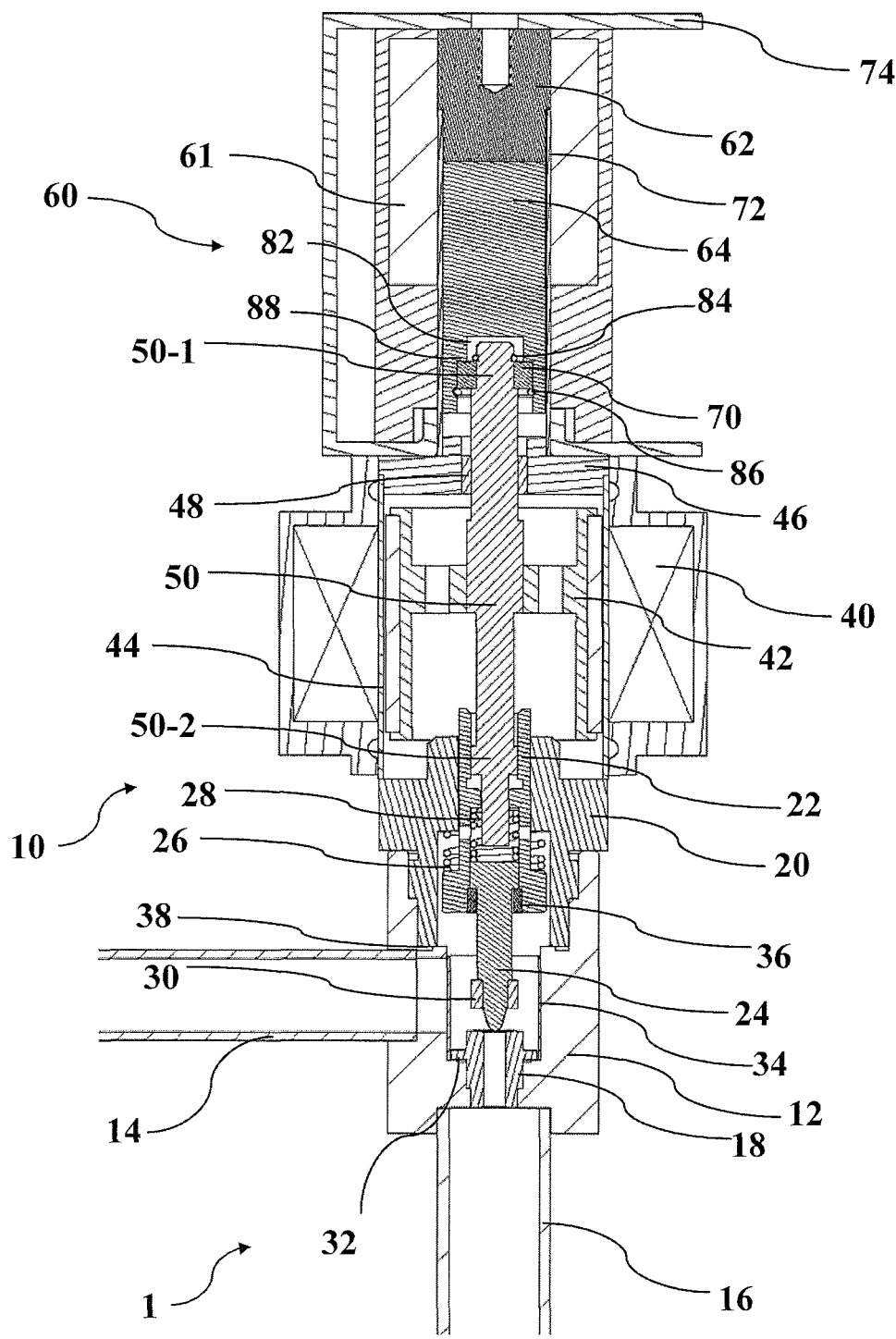
FIG. 6 is a sectional view of an electronic expansion valve according to a second embodiment of the present application.

A second embodiment according to the present application will be described hereinafter with reference to FIG. 6. In the second embodiment, the like reference signs are used to indicate the like elements as in the first embodiment and thus the description of the like elements will not be repeated.

The second embodiment is different from the first embodiment in for the way of fixing the spindle 50 to the movable iron 64. Specifically, in the second embodiment, a retaining ring 84 is provided on the first end 50-1 of the spindle 50 for limiting the axial displacement of the inner race of the rolling bearing 70, and a retaining ring 86 is provided in the inner cavity 82 of the movable iron 64 for limiting the axial displacement of the outer race of the rolling bearing 70. With such a configuration, the configuration of the electronic expansion valve may be further simplified and the costs may be saved.

Furthermore, the first embodiment may further be combined with the second embodiment. For example, the retaining ring 84 may be provided on the first end 50-1 of the spindle 50 for limiting the axial displacement of the inner race of the rolling bearing 70, and the nut member 66 may be provided at the end of the movable iron 64 fitted with the spindle 50 for limiting the axial displacement of the outer race of the rolling bearing 70. With such a configuration, the assemblability of the electronic expansion valve may be improved while the cost is saved.

Figure 7:
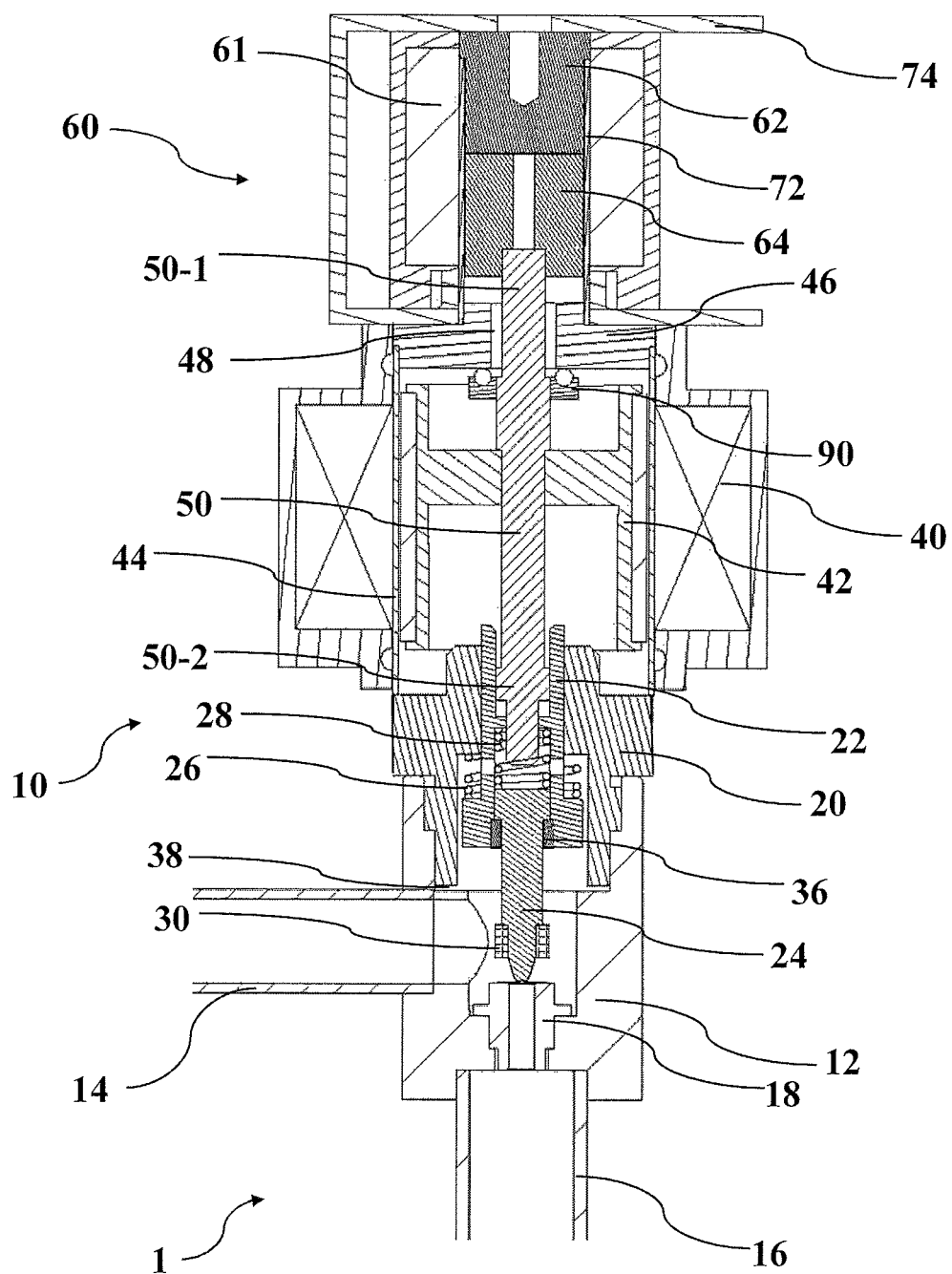
FIG. 7 is a sectional view of an electronic expansion valve according to a third embodiment of the present application.

A third embodiment according to the present application will be described hereinafter with reference to FIG. 7. In the third embodiment, the like reference signs are used to indicate the like elements as in the first embodiment and thus the description of the like elements will not be repeated.

The third embodiment is different from the first embodiment in the way of fixing the spindle 50 to the movable iron 64. Specifically, in the third embodiment, the movable iron 64 is fixedly connected to the first end 50-1 of the spindle 50. Therefore, the configuration of the electronic expansion valve may be further simplified and the cost may be saved.

In addition, a thrust bearing, which can abut against a fixing component such as the stopper 46 of the electronic expansion valve 1 so as to limit an axial displacement of the spindle 50, may be provided on the portion of the spindle 50 close to the first end 50-1 thereof. Preferably, the thrust bearing is a one-way thrust ball bearing 90.

Various embodiments of the present application have been described above with reference to FIGS. 1 to 7. However, it should be appreciated for the skilled in the art that the present application is not limited to the embodiments shown in the drawings, and various variations may be made. For example, the longitudinal axis of the electromagnetic retaining mechanism 60 may be substantially perpendicular to the axis of rotation of the spindle 50. In such a case, an annular stopper or groove may be provided at the first end of the spindle, and a matched component capable of being engaged with the stopper or groove may be provided at an end of the movable iron. In this way, when the electromagnetic retaining mechanism is energized, the matched component protrudes to be engaged with the stopper or groove as the movable iron moves, so as to retain the spindle at the first axial position, and when the electromagnetic retaining mechanism is de-energized, the matched component may retract, for example, under the action of a spring, so as to release the spindle to the second axial position. The above configuration may achieve the same technical effects as the above embodiment as well.

Furthermore, in the above embodiment, the spindle 50 and the rotor 42 are fixedly connected. Alternatively, the spindle 50 may be slidably fitted in the rotor 42. In this way, the spindle 50 may move along with the rotor 42, however, will not apply axial load to the rotor 42. On the other hand, an axial space required for achieving the rotor to move axially along with the spindle in the motor component may be saved as well.

While various embodiments of the present application have been described in detail herein, it should be understood that the present application is not limited to the specific embodiments described and illustrated herein in detail, and that those skilled in the art can also make other variations and modifications without departing from the spirit and scope of the application. These variations and modifications should also be deemed to fall into the protective scope of the application. Furthermore, all the elements described herein can be replaced by other technically equivalent elements.

What is claimed is:

1. An electronic expansion valve, comprising:
   a valve component for regulating flow rate of fluid flowing through the electronic expansion valve, wherein the valve component comprises a valve body, a valve seat arranged in the valve body, a valve needle able to open and close the valve seat, an actuation mechanism for driving the valve needle to move axially, and a drive mechanism for providing the actuation mechanism with motive power, and wherein the actuation mechanism comprises a spindle which is movable axially; and
   an electromagnetic retaining mechanism for retaining the spindle, wherein when the electromagnetic retaining mechanism is energized, the electromagnetic retaining mechanism retains the spindle in a first axial position at which the valve needle is allowed to adjust the opening degree of the valve seat, and when the electromagnetic retaining mechanism is de-energized, the electromagnetic retaining mechanism releases the spindle to a second axial position at which the valve needle closes the valve seat,
   wherein the electromagnetic retaining mechanism comprises an electromagnetic coil, a fixed iron stationary relative to the electromagnetic coil, and a movable iron movable relative to the fixed iron,
   wherein the movable iron is connected to a first end of the spindle in such a manner that the movable iron is rotatable but cannot move axially relative to the spindle, and
   wherein a rolling bearing is provided between the movable iron and the first end of the spindle, and comprises an inner race fitted with the first end of the spindle and an outer race fitted with the movable iron.

2. The electronic expansion valve according to claim 1, wherein a nut member for limiting an axial movement of the inner race of the rolling bearing is provided on the first end of the spindle, and a nut member for limiting an axial movement of the outer race of the rolling bearing is provided at an end, fitted with the spindle, of the movable iron.

3. The electronic expansion valve according to claim 1, wherein a retaining ring for limiting an axial movement of the inner race of the rolling bearing is provided on the first end of the spindle, and a retaining ring for limiting an axial movement of the outer race of the rolling bearing is provided in an inner cavity of the movable iron.

4. The electronic expansion valve according to claim 1, wherein a retaining ring (84) for limiting an axial displacement of the inner race of the rolling bearing is provided on the first end of the spindle, and a nut member for limiting an axial movement of the outer race of the rolling bearing is provided at an end, fitted with the spindle, of the movable iron.

5. The electronic expansion valve according to claim 1, wherein a longitudinal axis of the electromagnetic retaining mechanism is substantially coincident with an axis of rotation of the spindle.

6. The electronic expansion valve according to claim 5, wherein the electromagnetic retaining mechanism is arranged at an upper side of the valve component.

7. The electronic expansion valve according to claim 1, wherein the distance between the first axial position and the second axial position is larger than or equal to the largest stroke of the valve needle in adjusting an opening degree of the valve seat.

8. The electronic expansion valve according to claim 1, wherein the actuation mechanism further comprises a supporting seat fixed relative to the vale body, a through hole being formed in the supporting seat, and a nut sleeve which is slidable but cannot rotate in the through hole, wherein a second end of the spindle is connected to the valve needle via the nut sleeve.

9. The electronic expansion valve according to claim 8, wherein the through hole has a non-circular inner circumferential surface, and the nut sleeve has a non-circular outer circumferential surface matched with the non-circular inner circumferential surface of the through hole.

10. The electronic expansion valve according to claim 8, wherein the through hole has a polygon inner circumferential surface, and the nut sleeve has a polygon outer circumferential surface matched with the polygon inner circumferential surface of the through hole.

11. The electronic expansion valve according to claim 8, wherein the through hole has a circular inner circumferential surface, with a key slot or key being formed on the inner circumferential surface, and the nut sleeve has a circular outer circumferential surface, with a key or key slot being formed on the outer circumferential surface and being matched with the key slot or key on the inner circumferential surface.

12. The electronic expansion valve according to claim 8, wherein a stepped portion is formed on an outer side of an end, fitted with the valve needle, of the nut sleeve, and a compression spring is provided between the stepped portion and the supporting seat.

13. The electronic expansion valve according to claim 1, wherein a sealing block is provided at an end, fitted with the valve seat, of the valve needle and is configured to be capable of abutting against an end face of the valve seat.

14. The electronic expansion valve according to claim 1, wherein the drive mechanism comprises a stator and a rotor rotatable in the stator, and the spindle is fitted with the rotor such as to rotate together.

15. The electronic expansion valve according to claim 14, wherein the spindle is fixedly connected with the rotor.

16. The electronic expansion valve according to claim 14, wherein the spindle is slidably fitted in the rotor.

17. An electronic expansion valve, comprising:
a valve component for regulating flow rate of fluid flowing through the electronic expansion valve, wherein the valve component comprises a valve body, a valve seat arranged in the valve body, a valve needle able to open and close the valve seat, an actuation mechanism for driving the valve needle to move axially, and a drive mechanism for providing the actuation mechanism with motive power, and wherein the actuation mechanism comprises a spindle which is movable axially; and
an electromagnetic retaining mechanism for retaining the spindle, wherein when the electromagnetic retaining mechanism is energized, the electromagnetic retaining mechanism retains the spindle in a first axial position at which the valve needle is allowed to adjust the opening degree of the valve seat, and when the electromagnetic retaining mechanism is de-energized, the electromagnetic retaining mechanism releases the spindle to a second axial position at which the valve needle closes the valve seat,
wherein the actuation mechanism further comprises a supporting seat fixed relative to the vale body, a through hole being formed in the supporting seat, and a nut sleeve which is slidable but cannot rotate in the through hole, and wherein a second end of the spindle is connected to the valve needle via the nut sleeve, and
wherein the nut sleeve comprises a first section having an internal screw thread and a second section having no screw thread, an external screw thread is formed at the second end of the spindle, and the second end of the spindle is engaged with the first section of the nut sleeve via the internal screw thread and the external screw thread.

18. The electronic expansion valve according to claim 17, wherein an end of the valve needle is fitted in the second section of the nut sleeve.

19. The electronic expansion valve according to claim 18, wherein a stepped portion is provided between the first section and the second section of the nut sleeve, a compression spring is provided between the stepped portion and the valve needle, and the valve needle is slidable in the second section of the nut sleeve.

20. The electronic expansion valve according to claim 19, wherein a fixing ring for retaining the valve needle is provided at an end of the second section of the nut sleeve.

21. The electronic expansion valve according to claim 17, wherein the movable iron is fixedly connected to a first end of the spindle.

22. The electronic expansion valve according to claim 21, wherein a thrust bearing is provided on a portion of the spindle close to the first end thereof and is configured to limit an axial displacement of the spindle by abutting against a fixing component of the electronic expansion valve.

23. The electronic expansion valve according to claim 22, wherein the thrust bearing is a one-way thrust ball bearing.

* * * * *